United States Patent [19]

Vancha

[11] 4,336,605
[45] Jun. 22, 1982

[54] MULTIPLEXER FOR ULTRASONIC RANGING DEVICE

[75] Inventor: John Vancha, Bolingbrook, Ill.

[73] Assignee: Hurst Performance, Inc., Warminster, Pa.

[21] Appl. No.: 191,461

[22] Filed: Sep. 26, 1980

Related U.S. Application Data

[63] Continuation-in-part of Ser. No. 171,529, Jul. 23, 1980.

[51] Int. Cl.³ .............................................. G01S 15/88
[52] U.S. Cl. ................................... 367/105; 367/138; 367/903; 370/32
[58] Field of Search ..................... 367/105, 138, 903; 343/5 SW; 370/32, 85; 455/78

[56] References Cited

U.S. PATENT DOCUMENTS

| | | | |
|---|---|---|---|
| 3,757,285 | 9/1973 | Ferré | 367/105 |
| 3,876,938 | 4/1975 | Ohta et al. | 367/903 X |
| 4,045,766 | 8/1977 | Iida et al. | 367/105 |
| 4,225,951 | 9/1980 | Menin et al. | 367/105 |

Primary Examiner—Richard A. Farley
Attorney, Agent, or Firm—George R. Clark; Neil M. Rose; Robert J. Fox

[57] ABSTRACT

A multiplexer for an ultrasonic ranging device for a vehicle having a resettable digital counter is disclosed herein. The digital counter receives a plurality of pulses from an oscillator and provides a counter output signal indicative of the stored count of the number of pulses. A plurality of logic gates are connected to the digital counter for control thereby. A plurality of ultrasonic transducers are connected to the logic gates, the logic gates sequentially energizing the transducers in response to the stored count in the digital counter.

2 Claims, 2 Drawing Figures

MULTIPLEXER FOR ULTRASONIC RANGING DEVICE

CROSS-REFERENCE TO RELATED APPLICATION

The instant application is a continuation in part of a patent application entitled ULTRASONIC RANGING DEVICE, Ser. No. 171,529, filed July 23, 1980 in the U.S. Patent & Trademark Office.

BACKGROUND OF THE INVENTION

Although the prior art teaches a number of sonar or ultrasonic ranging devices, typical of which is that shown in U.S. Pat. No. 3,360,775 to Schroeder, and U.S. Pat. No. 3,922,629 to Hayakawa, there do not appear to be any prior art ultrasonic ranging devices specifically adapted for use by most drivers of passenger vehicles.

Although an ultrasonic ranging device having a single transducer used for both transmission and reception is highly desirable, it may be appreciated that a ranging device having a plurality of transducers, each being able to transmit and receive, is particularly useful for a vehicle, such as an automobile. This is because a single transducer, such as the transducer employed in the apparatus of the parent application, normally covers a limited angular area. If the single transducer is mounted in the bumper of a vehicle, the transducer may not sense objects which are positioned relatively close to the bumper of the car, but which are outside the limited angular area. It is desirable, therefore, to use a plurality of transducers.

It is also necessary to eliminate cross-talk between adjacent transducers. Cross-talk can result in false return from a first transducer picking up a transmitted signal from a second tranducer. This would cause an incorrect warning indication to be provided to a vehicle operator.

Thus, it is clear that what is needed is a relatively low cost ultrasonic ranging system having a plurality of transducers, each transducer being used for both transmitting and receiving, which can inform the driver through the use of an indicator means that a vehicle is within a predetermined range of an obstacle.

SUMMARY OF THE INVENTION

A multiplexer for an ultrasonic ranging device for use in a vehicle, such as an automobile is disclosed herein. The unit is adapted to be used with an ultrasonic ranging device of the type disclosed in the parent application, Ser. No. 171,529.

The unit includes a counter connected to receive a periodic transducer gating signal from a sequential timer. A plurality of logic gates is connected to the counter, respective ones of the logic gates being enabled sequentially in response to the stored count within the counter. Each gate of a first plurality of logic gates is connected to a respective high power analog gate. All of the high powered analog gates are connected to a power amplifier of the type disclosed in the parent application. Each of the analog gates is enabled in sequence by its respective logic gate to supply a burst of 23 kHz. alternating current to a respective transducer.

A first receiver stage is connected to each of the respective transducers to receive return pulses. A transistor shorting switch is connected to selectively shunt each of the receiver first stages to selectively disable the receiver in the event that the logic gate connected to it is not enabled. All of the receiver first stages are also connected to further receiver stages of the receiver, as disclosed in the parent application.

It is a principal object of the present invention to provide a multiplexer for automotive ultrasonic ranging devices. It is another object of the instant invention to provide a multiplexer for an ultrasonic ranging device having a plurality of transducers, each transducer being enabled one at a time by the multiplexer.

Further objects of the instant invention will become obvious to one skilled in the art upon a perusal of the specification and claims in light of the accompanying drawings.

DESCRIPTION OF THE PREFERRED EMBODIMENT

Figure 1:
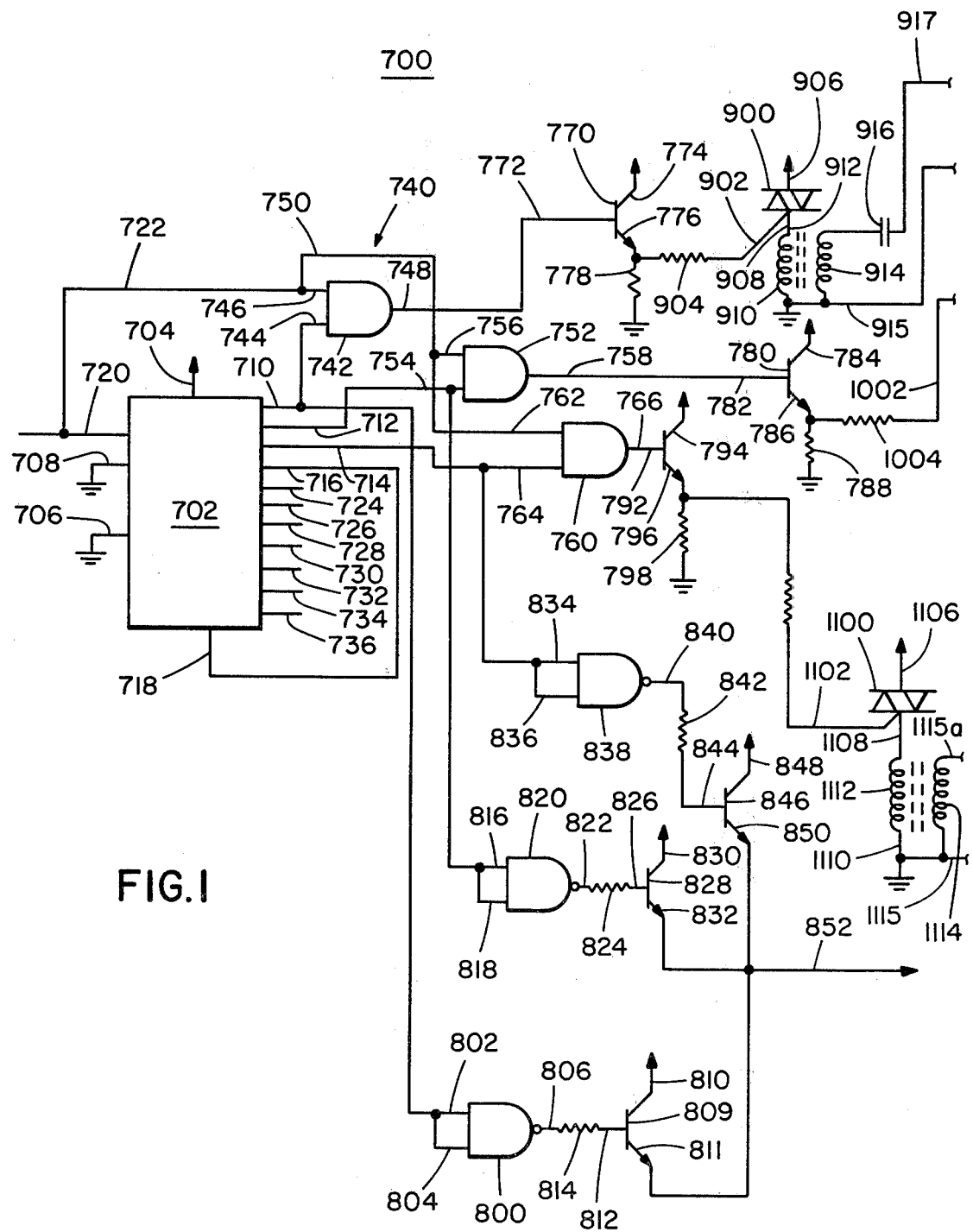
FIG. 1 is a schematic diagram showing details of a portion of the multiplexer for the ultrasonic ranging device disclosed herein.
Figure 2:
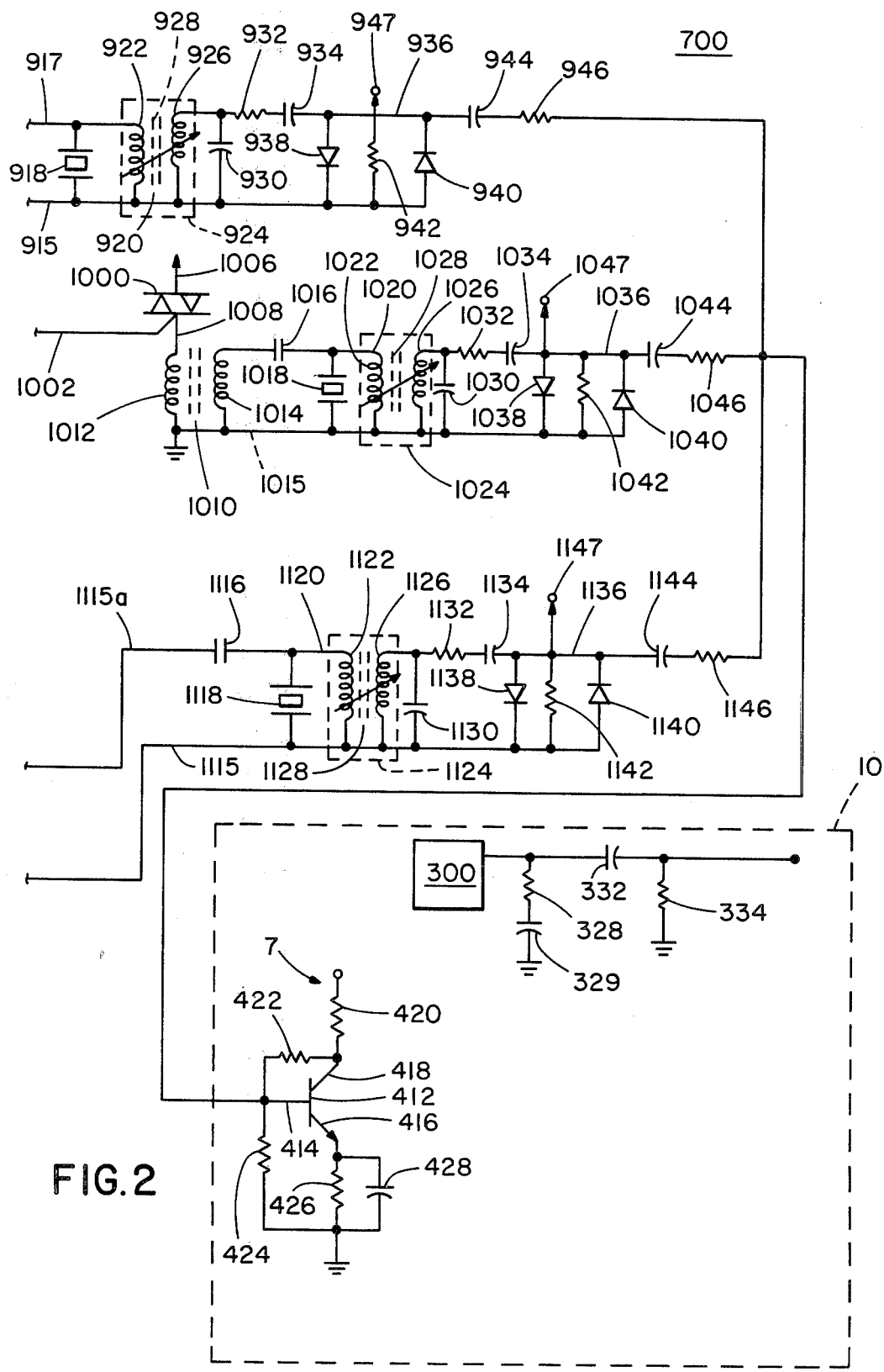
FIG. 2 is a schematic diagram showing details of a second portion of the multiplexer for the ultrasonic ranging device.

Referring now to FIG. 1 of the drawings, a multiplexer having an ultrasonic ranging device generally indicated by numeral 700 is disclosed therein. The disclosure of the parent application, U.S. Ser. No. 171,529 to Vancha, directed to an ultrasonic ranging device is incorporated herein by reference.

Multiplexer 700 includes a counter 702 comprised of a 4017 Decade Counter/Divider, which is connected at a $V_{DD}$ pin 704 to the positive power supply lead 26 disclosed in the parent case. A $V_{SS}$ terminal 706 and a Clock Enable terminal 708 are connected to ground, in this embodiment to ground lead 610 of the ultrasonic ranging device 10 disclosed in the parent application. Counter 702 has a plurality of output pins including a decoded output "0" pin 710, a decoded output "1" pin 712, and a decoded output "2" pin 714. A decoded output "3" pin 716 is connected to a Reset pin 718. A Clock pin 720 is connected to output pin 113 of monostable timer 102 of the ultrasonic ranging device 16 disclosed in the parent application. A lead 722 is also connected to Clock pin 720 for conduction of the 10 Hz. 500 microsecond duration transmitter enabling signal to other portions of the multiplexer circuit. A decoded output "4" pin 724, a decoded output "5" pin 726, a decoded output "6" pin 728, a decoded output "7" pin 730, a decoded output "8" pin 732, a decoded output "9" pin 734, and a Carry Out pin 736 are left floating.

Counter 702 provides three sequential timing signals for selectively enabling and disabling three transducers, one at a time, as will be described in detail below. When the first clock pulse from the lead 113 of the monostable 102 is received at clock pin 720, a HIGH output is present at a decoded output "0" pin 710. When the next clock pulse is received, pin 710 goes LOW and decoded output "1" pin 712 goes HIGH. Upon receipt of the next 500 microsecond pulse pin 712 and pin 710 are held LOW while a decoded output "2" pin 714 is driven HIGH. Upon receipt of the next clock pulse decoded output "3" pin 716 goes HIGH while pins 710, 712, and 714 are held LOW. The HIGH signal is supplied to Reset pin 718 to reset counter 702 to "0" and switches pin 710 HIGH. Each time one of the pins 710, 712, or 714 goes HIGH, lead 722 also goes HIGH due to the 500 microsecond duration pulse.

A transmitter logic network 740 comprised of a plurality of AND gates processes the signals from counter pins 710, 712 and 716 to selectively switch three transducers on and off in sequence. Included is an AND gate 742 having a pair of input terminals 744 and 746 and an output terminal 748. Input terminal 746 is connected to lead 722 to receive each of the 500 microsecond duration transmitter gating pulses. A pulse shunt lead 750 is also connected to lead 722. Terminal 744 is connected to output pin 710 of counter 702.

An AND gate 752 having a pair of input terminals 754 and 756 and an output terminal 758 receives the 500 microsecond duration pulses from monostable multivibrator 102 through lead 750 and input terminal 756. Terminal 754 of AND gate 752 is connected to receive signals from pin 712 of counter 702.

In a similar fashion, an AND gate 760 having a pair of input terminals 762 and 764 and an output terminal 766 is connected at input terminal 762 to lead 750 to receive each of the 500 microsecond duration transmitter gating pulses. Input terminal 764 is connected to counter pin 714 to receive its driving signal therefrom.

Thus, each time the 500 microsecond duration transmitter gating signal is supplied to Clock pin 720 of counter 702, terminals 746, 756 and 762 of respective AND gates 742, 752, and 760 are driven HIGH. AND gate 742 has its output terminal 748 switched HIGH only when decoded output "0" pin 710 goes HIGH. AND gate 752 has its output terminal 758 driven HIGH when decoded output "1" pin 712 goes HIGH. AND gate 760 has its output terminal 766 driven HIGH when decoded output "2" pin 714 of counter 702 goes HIGH. Thus, a HIGH driving signal occurs sequentially on output terminals 748, 758, and 760.

A switching transistor is connected to each of logic gates 742, 752, and 760. An NPN transmitter control switching transistor 770 is connected at a base 772 to output terminal 748. Transistor 770 has a collector 774 connected to D.C. supply lead 26 of the ultrasonic ranging device 10 of the parent application for receipt of positive D.C. voltage. An emitter 776 is connected to a resistor 778, which is in turn connected to ground. When decoded output "0" pin 710 goes HIGH, gate 742 supplies a HIGH signal to base 772, switching transistor 770 conducting and providing a trigger potential at the junction of emitter 776 and resistor 778.

A second NPN transmitter control switching transistor 780 has a base 782 connected to output terminal 758 of AND gate 752. A collector 784 is connected to the power supply lead 26 and an emitter 786 is connected through a resistor 788 to ground. When decoded output "1" pin 712 goes HIGH, output lead 758 of gate 752 is driven HIGH, switching transistor 780 conducting and providing a trigger potential at the junction of emitter 786 and resistor 788.

A third NPN transmitter control switching transistor 790 is connected at a base 792 to output terminal 766 of an AND gate 760. Transistor 790 has a collector 794 connected to the positive D.C. power supply lead 26. An emitter 796 is connected to a grounded resistor 798. When decoded output "2" pin 714 goes HIGH, output terminal 766 of AND gate 760 also goes HIGH, switching transistor 790 conducting to provide a trigger potential at the junction of emitter 796 and resistor 798. Thus, it is apparent that trigger potentials are supplied sequentially at transistors 770, 780, and 790.

At the same time that transistors 770 switches conducting, the HIGH signal from decoded output "0" pin 710 is supplied to a NAND gate 800 having a pair of input terminals 802 and 804, both connected to receive the HIGH signal from decoded output "0" pin 710. When the HIGH signal is present at input terminals 802 and 804, an output terminal 806 of NAND gate 800 is driven LOW causing an NPN transistor 809 having a collector 810, an emitter 811, and a base 812, base 812 being connected through a resistor 814 to output terminal 806, to be biased in the cutoff region.

Similarly, when transistor 780 is switched conducting to provide the second trigger potential, the HIGH signal from decoded output "1" pin 712 is supplied to a pair of input terminals 816 and 818 of a NAND gate 820. An output terminal 822 of NAND gate 820 is driven LOW, thereby supplying a LOW signal through a resistor 824 to a base 826 of a transistor 828 driving transistor 828 into cutoff. Transistor 828 also includes a collector 830 and a current emitter 832.

When transistor 790 is switched conducting, the HIGH signal from decoded output "2" pin 714 is also supplied to a pair of input terminals 834 and 836 of a NAND gate 838, causing an output terminal 840 of NAND gate 838 to be driven LOW supplying the LOW signal through a resistor 842 to a base 844 of an NPN transistor 846 having a collector 848 and an emitter 850. Thus, when transistor 790 is biased into saturation, transistor 846 is biased in cutoff. It may be appreciated that emitters 811, 832 and 850 are connected to a common lead 852. Collectors 810, 830 and 848 are connected to respective other portions of the circuit as will be explained in detail below.

A triac 900 is connected at a gate 902 through a resistor 904 to the junction of emitter 776 and resistor 778 to receive the gating signal therefrom. A first main terminal 906 of triac 900 is connected to capacitor 332, as disclosed in the parent application, to receive the amplified 23 kHz, sine wave signal burst. A second main terminal 908 of triac 900 is connected to a transformer 910 at a primary winding 912. A secondary winding 914 of transformer 910 is connected to primary winding 912 and to a lead 915. Triac 900 is switched conducting to allow the amplified sine wave burst to be boosted through the transformer 910 to an amplitude of 43 volts peak-to-peak. The 43 volt peak-to-peak signal is fed through lead 915 and AC coupled through a capacitor 916 and a lead 917 to a piezoelectric transducer 918. Piezoelectric transducer 918 is, in this embodiment, mounted in the rear bumper of an automobile, although it may be appreciated that transducer 918 may be mounted at other portions of the automobile in other embodiments. Transducer 918 generates a 500 microsecond duration tone burst having a 23 kHz. frequency in response to the 43 volt peak-to-peak signal supplied through coupling capacitor 916.

After the tone burst is generated by transducer 918, nearby objects will reflect the ultrasonic burst back to transducer 918. The echoes and return signals cause transducer 918 to generate a 23 kHz. return electrical signal.

The electrical return signal is supplied from transducer 918 to a shielded transformer 920. The return signal which is fed to a primary winding 922 is also grounded and is connected to a shield 924. A secondary winding 926 is also connected to ground and is inductibly coupled to primary winding 922, input through a variable slug 928. A capacitor 930 is connected across secondary winding 926 to complete a tuned circuit with transformer 920. The tuned circuit is factory preset to a resonant frequency of 23 kHz. by adjustment of slug 928. The tuned circuit is embodied to exclude extraneous noise from the receiver 7, which may be picked up by transducer 918 and could give a false return indication. The tuned return signal is then supplied to a resistor 932 connected to a capacitor 934.

A clipping circuit 936 is connected to capacitor 934 and to ground return 915. Clipping circuit 936 is required because the 43 volt transmission signal supplied to transducer 918 is also at least partially supplied to receiver 7, since receiver 7 is connected to transducer 918. In order to prevent damage to receiver 7 and to prevent false return indications due to the high voltage transmitting signal, clipping circuit 936 conducts to ground all signals having an amplitude exceeding either plus or minus 0.7 volts. The clipping is achieved by a pair of oppositely poled diodes 938 and 940 which are connected in parallel with each other to ground. A fixed resistor 942 is connected to ground in parallel with diodes 938 and 940.

A coupling capacitor 944 is connected to diode 940 and supplies the clipped signal to a resistor 946. Resistor 946 is connected to junction of resistors 422 and 424 and base 414 of transistor 412, as disclosed in the parent application. Transistor 412 then feeds the signal to other portions of the receiver 7.

Signals from transducer 918 will only be fed to capacitor 944 and resistor 946 when transistor 809 is in cutoff. This is due to the fact that collector 810 is connected at a terminal 947 to clipper 936 and common emitter lead 852 is connected to the grounded junction of resistor 426 and capacitor 428. Transistor 809 acts as a shunt to conduct all transducer signals to ground except when biased in cutoff by NAND gate 800.

A triac 1000 is connected at a gate 1002 through a resistor 1004 to the junction of emitter 786 and resistor 788 to receive the gating signal therefrom. A first main terminal 1006 of triac 1000 is connected to capacitor 332, as disclosed in the parent application, to receive the amplified 23 kHz. sine wave signal burst. A second main terminal 1008 of triac 1000 is connected to a transformer 1010 at a primary winding 1012. A secondary winding 1014 of transformer 1010 is connected to primary winding 1012 and to a lead 1015. Triac 1000 is switched conducting to allow the amplified sine wave burst to be boosted through the transformer 1010 to an amplitude of 43 volts peak-to-peak. The 43 volt peak-to-peak signal is fed through lead 1015 and AC coupled through a capacitor 1016 to a piezoelectric transducer 1018. Piezoelectric transducer 1018 is, in this embodiment, mounted in the rear bumper of an automobile, although it may be appreciated that transducer 1018 may be mounted at other portions of the automobile in other embodiments. Transducer 1018 generates a 500 microsecond duration tone burst having a 23 kHz. frequency in response to the 43 volt peak-to-peak signal supplied through coupling capacitor 1016.

After the tone burst is generated by transducer 1018, nearby objects will reflect the ultrasonic burst back to transducer 1018. The echoes and return signals cause transducer 1018 to generate a 23 kHz. return electrical signal.

The electrical return signal is supplied from transducer 1018 to a shielded transformer 1020. The return signal which is fed to a primary winding 1022 is also grounded and is connected to a shield 1024. A secondary winding 1026 is also connected to ground and is inductibly coupled to primary winding 1022, input through a variable slug 1028. A capacitor 1030 is connected across secondary winding 1026 to complete a tuned circuit with transformer 1020. The tuned circuit is factory preset to a resonant frequency of 23 kHz. adjustment of slug 1028. The tuned circuit is embodied to exclude extraneous noise from the receiver 7, which may be picked up by transducer 1018 and could give a false return indication. The tuned return signal is then supplied to a resistor 1032 connected to a capacitor 1034.

A clipping circuit 1036 is connected to capacitor 1034 and to ground return lead 1015. Clipping circuit 1036 is required because the 43 volt transmission signal supplied to transducer 1018 is also at least variably supplied to receiver 7 since a portion of receiver 7 is connected to transducer 1018. In order to prevent damage to receiver 7 and to prevent false return indications due to the high voltage transmitting signal clipping circuit 1036 conducts to ground all signals having an amplitude exceeding either plus or minus 0.7 volts. The clipping is achieved by a pair of oppositely poled diodes 1038 and 1040, which are connected in parallel with each other to ground. A fixed resistor 1042 is connected to ground in parallel with diodes 1038 and 1040.

A coupling capacitor 1044 is connected to diode 1040 and supplies the clipped signal to a resistor 1046. Resistor 1046 is connected to junction of resistors 422 and 424 and base 414 of transistor 412, as disclosed in the parent application. Transistor 412 then feeds the signal to other portions of receiver 7.

Signals from transducer 1018 will only be fed to capacitor 1044 and resistor 1046 when transistor 828 is in cutoff. This is due to the fact that collector 830 is connected at a terminal 1047 to clipper 1036 and common emitter lead 852 is connected to the grounded junction of resistor 426 and capacitor 428. Transistor 828 acts as a shunt to conduct all transducer signals to ground except when biased in cutoff by NAND gate 820.

A triac 1100 is connected at a gate 1102 through a resistor 1104 to the junction of emitter 796 and resistor 798 to receive the gating signal therefrom. A first main terminal 1106 of triac 1100 is connected to capacitor 332, as disclosed in the parent application, to receive the amplified 23 kHz. sine wave signal burst. A second main terminal 1108 of triac 1100 is connected to a transformer 1110 at a primary winding 1112. A secondary winding 1114 of transformer 1110 is connected to primary winding 1112 and to a lead 1115. A lead 1115a is also connected to secondary winding 1114. Triac 1100 is switched conducting to allow the amplified sine wave burst to be boosted through the transformer 1110 to an amplitude of 43 volts peak-to-peak. The 43 volt peak-to-peak signal is fed through leads 1115 and 1115a and AC coupled through a capacitor 1116 to a piezoelectric transducer 1118. Piezoelectric transducer 1118 is, in this embodiment, mounted in the rear bumper of an automobile, although it may be appreciated that transducer 1118 may be mounted at other portions of the automobile in other embodiments. Transducer 1118 generates 500 microsecond duration tone burst having a 23 kHz. frequency in response to the 43 volt peak-to-peak signal supplied through coupling capacitor 1116.

After the tone burst is generated by transducer 1118, nearby objects will reflect the ultrasonic burst back to transducer 1118. The echoes and return signals cause transducer 1118 to generate a 23 kHz. return electrical signal.

The electrical return signal is supplied from transducer 1118 to a shielded transformer 1120. The return signal which is fed to a primary winding 1122 is also grounded and is connected to a shield 1124. A secondary winding 1126 is also connected to ground and is inductibly coupled to primary winding 1122, input through a variable slug 1128. A capacitor 1130 is connected across secondary winding 1126 to complete a tuned circuit with transformer 1120. The tuned circuit is factory preset to a resonant frequency of 23 kHz. adjustment of slug 1128. The tuned circuit is embodied to exclude extraneous noise from the receiver 7 which may be picked up by transducer 418 and could give a false return indication. The tuned return signal is then supplied to a resistor 1132 connected to a capacitor 1134.

A clipping circuit 1136 is connected to capacitor 1134 and to ground return 1115. Clipping circuit 1136 is required because the 43 volt transmission signal supplied to transducer 1118 is also at least partially supplied to a portion of receiver 7, since receiver 7 is connected to transducer 1118. In order to prevent damage to receiver 7 and to prevent false return indications due to the high voltage transmitting signal, clipping circuit 1136 conducts to ground all signals having an amplitude exceeding either plus or minus 0.7 volts. The clipping is achieved by a pair of oppositely poled diodes 1138 and 1140, which are connected in parallel with each other to ground. A fixed resistor 1142 is connected to ground in parallel with diodes 1138 and 1140.

A coupling capacitor 1144 is connected to diode 1140 and supplies the clipped signal to a resistor 1146. Resistor 1146 is connected to junction of resistors 422 and 424 and base 414 of transistor 412, as disclosed in the parent application. Transistor 412 then feeds the signal to other portions of receiver 7.

Signals from transducer 1118 will only be fed to capacitor 1144 and resistor 1146 when transistor 846 is in cutoff. This is due to the fact that collector 848 is connected at a terminal 1147 to clipper 1136 and common emitter lead 852 is connected to the grounded junction of resistor 426 and capacitor 428. Transistor 846 acts as a shunt to conduct all transducer signals to ground except when biased in cutoff by NAND gate 838.

Thus, when the first pulse is received by counter 702 from monostable 102, decoded output "0" pin 710 goes HIGH causing triac 900 to conduct the 23 kHz. sine wave thereby energizing transducer 918. At the same time transistor 809 is switched from saturation to cutoff to allow the return signal from transducer 918 to be conducted past clipper 936 to transistor 412. No signals are received by transistor 412 from transducers 1018 or 1118, since transistors 828 and 848 are held conducting thereby shunting the respective transducer signals to ground. Similarly, upon receipt of the next clock pulse, decoded output "1" pin 712 is driven HIGH switching triac 1000 conducting to energize transducer 1018, while simultaneously transistor 828 is cut off, thereby allowing the return signal from transducer 1018 to be supplied to transistor 412 while transistors 809 and 846 are held in saturation, thereby shunting signals from transducers 918 and 1118 to ground. Upon receipt of the third clock pulse, decoded output "2" pin 714 goes HIGH switching triac 1100 on to energize transducer 1118. Transistor 846 is simultaneously held in cutoff to allow return signals from transducer 1118 to be supplied to transistor 412. At the same time, transistors 809 and 828 are held in saturation to prevent signals from transducer 918 and 1018 from being supplied to transistor 412. Upon receipt of the next clock pulse, counter 702 is reset and the entire process is repeated again. Thus, it may be appreciated that only one transducer at a time is energized and only signals received from the energized transducer are supplied to other portions of the receiver 7 for processing.

While there has been shown and described a single embodiment of the present invention, it will be understood that changes and modifications may be made to the claims by those skilled in the art and it is, therefore, intended by the appended claims to cover all such changes and modifications as fall within the true spirit and scope of the present invention.

I claim:

1. A multiplexer for an ultrasonic ranging device for a vehicle comprising resettable counter means for receipt of a timing pulse train and providing a counter output signal indicative of a stored count of the number of pulses in said pulse train, said counter means resetting to zero upon a predetermined periodic output condition, switch means receiving said counter output signal and providing a switch output signal in response thereto, a plurality of ultrasonic transducers connected to said switch means, said transducers being successively sequentially energized in response to said output signal from said switch means, said switch means including a transmit gate which controls energization of a transmission control transistor connected between said transmit gate and one of said transducers and a receiver gate adapted to isolate selectively one of the transducers from a portion of a receiver by controlling a receiver control transistor connected to said receiver gate and to a portion of said receiver to shunt selectively a transducer return signal to ground when said receiver control transistor is in conduction.

2. A multiplexer for an ultrasonic ranging device for a vehicle as defined in claim 1 wherein said timing pulse train is supplied by a monostable multivibrator driven by an astable multivibrator.

* * * * *